June 7, 1932.    B. A. BALL    1,861,897
EYE EXERCISER
Filed March 21, 1930
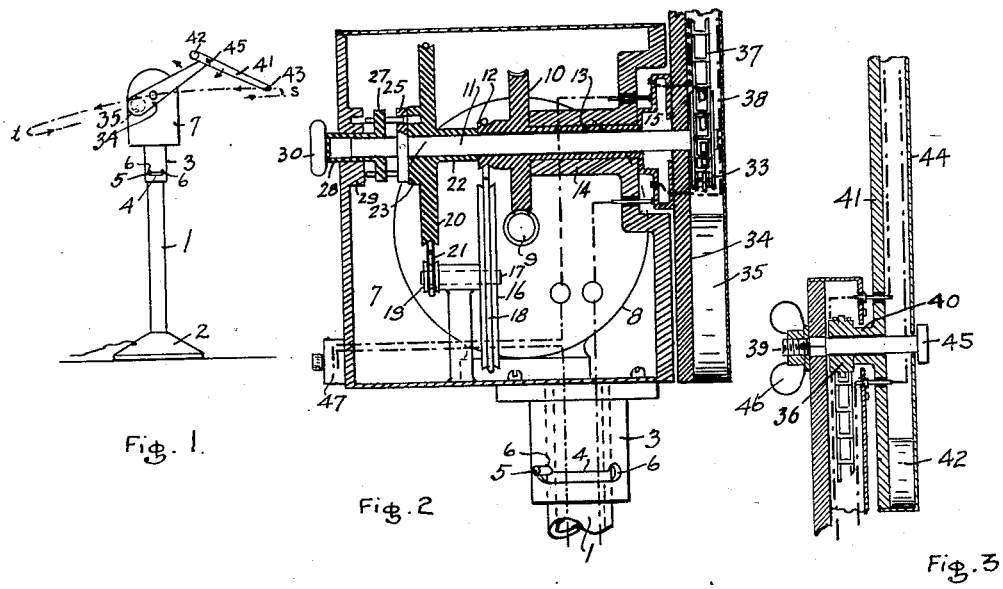
Fig. 1.    Fig. 2.
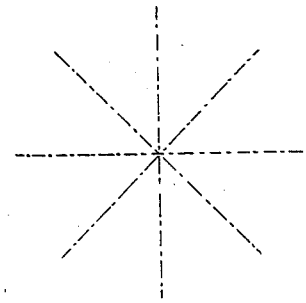
Fig. 4.
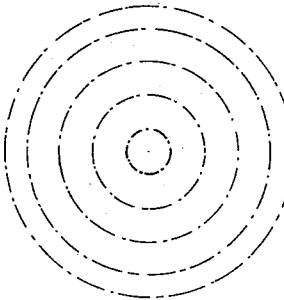
Fig. 5.
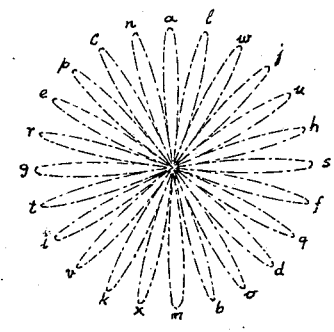
Fig. 6.
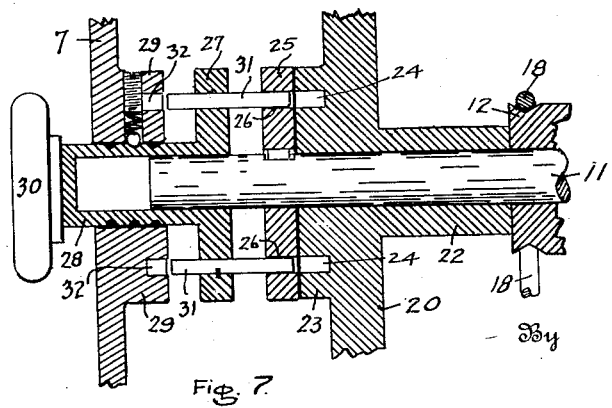
Fig. 7.
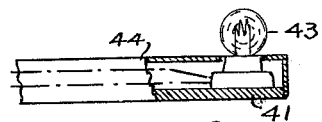
Fig. 8.
Inventor
Birtley A. Ball
By R. J. Elliott
Attorney Patented June 7, 1932

1,861,897

UNITED STATES PATENT OFFICE

BIRTLEY A. BALL, OF MILTON, WASHINGTON

EYE EXERCISER

Application filed March 21, 1930. Serial No. 437,715.

This invention relates to devices adapted to exercise the eye muscles, both those which direct the eye and those which focus it, thereby correcting certain common defects in one or both eyes.

The objects of my invention are, first, to provide a moving object or light which, when viewed from the front, may be made to move in straight lines, circles, or to follow a stellate course across the field of vision and, if viewed from the side, may be made to approach or recede from the eye on any of its said paths; second, which may be turned at right angles, without disturbing the patient, to enable it to be viewed either from the front or the side; third, in which the devices for changing the character of the course of travel of the light are of great simplicity; fourth, in which the mechanism for directing the course of the light and for producing its motion is of extreme simplicity; and fifth, which is simple and cheap to make and to use, and which effectively exercises the eye muscles of the patient.

I attain these and other objects by the devices, mechanisms, and arrangements illustrated in the accompanying drawing, in which—

Fig. 1 is a front view of my eye exercising machine, adjusted for giving a stellate motion to the light and showing a portion of the path passed through while the main arm is making about three-quarters of a revolution; Fig. 2 is a vertical longitudinal section of the machine head, showing the control in neutral position; Fig. 3 is a section of the joint between the inner and outer arms; Figs. 4, 5 and 6 are views of the several types of motions of the light across the field of vision, Fig. 4 showing four straight-line courses illustrative of the many such courses any one of which may be selected, Fig. 5 showing five circular courses illustrative of the many such courses to which the machine may be adjusted, and Fig. 6 showing a single stellate course of twenty-four loops and illustrative of the type produced by this machine, the number of whose loops depends on the relations of the rotation of the several shafts in the machine; Fig. 7 is an enlarged view of the control device of my machine, in neutral position; and Fig. 8 is a view of the end of the outer arm, showing the light mounted thereon.

Similar numerals of reference refer to similar parts throughout the several views.

My machine is mounted on a standard 1, having a substantial base 2 and terminating at its upper end in a cylindrical portion, whereon the socket 3 is loosely mounted. A slot 4 is made in the socket 3, wherein a pin 5 in the standard 1 engages. The slot 4 is of such length as to permit the socket 3 to turn through a right-angle thereon and may have notches 6 in its ends, adapted to receive the said pin 5 to retain said socket in either of said two extreme positions until manually moved therefrom.

A receptacle 7 is secured to the top end of the socket 3 and contains the electric motor 8 and the operating mechanism, and supports the inner arm. The operating mechanism is driven through a worm 9, mounted on the motor shaft, which meshes with a worm wheel 10 loosely mounted on the central or inner shaft 11. This worm wheel 10 is connected on the one side to the pinion pulley 12, and on the other side to the sleeve 13. The sleeve 13 is mounted in the outer bearing 14 and is provided with a circular box 15 at its outer end, to which the frame of the inner arm is attached. The said inner arm therefore rotates with the worm wheel 10.

The pinion pulley 12 is connected to and rotates the large wheel 16, mounted on the suitably supported jack-shaft 17, by means of the belt 18. A second pinion pulley 19 is also mounted on the jackshaft 17 and is connected to the second large wheel 20, by means of the belt 21. This second large wheel 20 is loosely mounted on the central shaft 11 and is provided with a sleeve 22, on the one side, extending to and touching the pinion pulley 12, and a boss 23 on the other side. The boss 23 is provided with two holes 24 spaced at diametrically opposed corresponding positions and parallel with the axis of the shaft 11. The wheel 20 and its boss 23 are therefore constantly rotated by the motor 8, but at a greatly reduced rate in comparison with that of the wheel 10 and the inner arm. A driving disk 25 is fixedly mounted on the central shaft 11, adjacent the boss 23, and is provided with two spaced holes 26 therein corresponding with the holes 24 in the said boss 23. An axially sliding driving disk 27 is provided with a sleeve 28 on its rear side. This sleeve 28 is mounted in a bearing 29 in the rear wall of the receptacle 7 and can turn and axially slide therein. An operating knob 30 is mounted on the end of the sleeve 28 outside of the receptacle 7. The sleeve 28 receives the rear end of the shaft 11 and forms a support therefor. The sliding driving disk 27 is provided with two pins 31, parallel to the axis of the shaft 11, said pins being spaced to lie in the two holes 26 in the driving disk 25 and to be slid into or out of said corresponding holes 24 in the boss 23 when the knob 30 is pushed inward from the neutral position shown. Thus, when the said knob 30 is pushed inward, the forward ends of the pins 31 enter the holes 24 of the driven boss 23 with the result that the disk 25 and the inner shaft 11 are rotated by the revolving boss 23. When the shaft 11 is thus rotated, then the hereinafter described apparatus causes the light to travel a stellate course. These pins 31 also extend from the disk 27 in the opposite or rearward direction and are adapted to enter suitable spaced holes 32 in the face of the bearing 29 when the knob 30 is pulled outward from the neutral position shown. Thus, when said knob 30 is pulled outward, the rearward ends of the pins 31 enter the holes 32 in the fixed bearing boss 29, with the result that the disk 25 and the inner shaft 11 are held from rotation thereby. When the shaft 11 is thus held from rotation, then the hereinafter described apparatus causes the light to travel on a straight-line course. These spaced holes 32 control the direction of the straight-line courses, as illustrated in Fig. 4, for instance, to make the four courses indicated therein, eight equally spaced holes 32 would be provided in the face of the bearing 29, said holes being arranged around the axis of the shaft 11. If six such holes were provided, then the light would travel on any one of three definite straight-line courses, and so forth. When the rearward ends of the pins 31 are inserted into any pair of holes 32, the light will follow the straight course corresponding therewith. If the knob 30 is pushed into neutral position, shown in Figs. 2 and 7, and is held from rotation, then the light will follow any intermediate straight-line course desired. A suitable notched means may be provided for holding the said sliding control parts in either one of its three positions. A sprocket wheel 33 is mounted on the front end of the shaft 11 and turns therewith.

Thus it will be seen that when the knob 30 is pulled outward, the shaft 11 and the sprocket wheel 33 are locked from rotation; also, when it is in the neutral position shown, the shaft 11 and the sprocket wheel 33 may be rotated at will either by turning the knob 30 or as hereinafter described by clamping the sprocket wheel 33 to the inner arm; and that when the knob 30 is pushed inward, the shaft 11 is clutched to the wheel 20 and the shaft 11 and the sprocket wheel 33 are therefore driven at a certain definite speed in relation to the speed of the worm wheel 10, such relation depending on the relative sizes of the wheels 12 and 16, and 19 and 20.

The inner arm comprises a frame or base piece 34, attached at an intermediate point to the box 15. A counterweight 35 (Fig. 2) is attached to one end of the arm frame 34 at a point relatively close to the axis of rotation. The other end of the arm 34 extends outward in the opposite direction and is preferably tapered towards its outer end and is adapted to carry the hereinafter described outer arm. The said central shaft 11 passes freely through the frame piece 34 and is not attached thereto. The said sprocket wheel 33 is secured to the front end of the said shaft 11 on the outer side of the arm frame 34. A second sprocket wheel 36 (Fig. 3) of exactly one-half the size as the first sprocket wheel 33, is mounted at the outer end of the arm 34. A sprocket chain 37 passes over both of the sprocket wheels 33 and 36 and operatively secures them together in the usual manner. A metal cover 38 is secured to the arm 34 to enclose the said counterweight 35 and the sprocket apparatus.

The said outer sprocket wheel 36 is mounted to rotate on a fixed pin 39 and is provided with a sleeve 40 extending outward from the sprocket wheel. The sleeve 40 is secured to the frame 41 of the outer arm so that the said outer arm 41 rotates on the pin 39 through the action of the sprockets. The arm 41 is provided with a counterweight 42 adjacent the said pin 39, and a small electric light 43 at its outer end. The distance from the pin 39 to the light 43 is preferably equal to the distance between the centers of the sprocket wheels 33 and 36, thus the light will pass through the center of rotation each time it crosses the field of vision. The arm 41 is also provided with a metal casing or cover 44 through which the pin 39 freely passes. The pin 39 has its head 45 outside of the casing 44 and is provided with a wing nut 46 adjacent the inner side of the inner arm 34. Normally this head 45 does not press on the casing 44, but when it is desired to cause the light 43 to travel in a circle, as shown in Fig. 5, the control knob 30 is placed in neutral position and the outer arm 41 is turned until the light 43 is at the desired distance from the center of rotation, then the nut 46 is tightened, thus clamping the two arms 34 and 41 together; thus causing the shaft 11 to turn with the worm wheel 10. When the light is to travel on a course similar to either Fig. 4 or Fig. 6 the said nut 46 is loosened, thereby releasing the clamping action of the head 45 on the arm 41.

The electric current may be conducted up the standard 1 to a switch 47 on the container 7 and thus to the electric motor 8 and, by suitable conducting rings and brushes it is conducted out the arms 34 and 41 to the light 43.

When the knob 30 is pulled out, the shaft 11 is held from rotation. As the arm 34 rotates it carries the sprocket wheel 36 around the sprocket wheel 33 and the sprocket chain 37 therefore advances and turns the sprocket wheel 36 twice for each revolution of the arm 34. That is to say the angle which the arm 41 makes to the arm 34 changes twice as fast as the angle that the arm 34 turns through, hence the light 43 will traverse a straight line across the field of vision, crossing the center of the machine and passing from one extreme point to the other.

When the knob 30 is pushed inward, the shaft 11 rotates slowly in comparison with the arm 34 (in the case illustrated it makes one turn to each twenty-four of the said arm 34) and therefore the straight-line path of the light is uniformly distorted into a curved line advancing one-twenty-fourth of the circle for each half revolution of the inner arm 34, thus the light travels from a to b to c to d . . . to x to a (Fig. 6) continuously and, if the eye follows its movement, it is given exercise in every direction, each movement being different from the preceding movement. The movement of the arm 34 is slow, about twelve revolutions per minute being preferred, hence the eye has no trouble in following the movement of the light which therefore swings across the field of vision every two-and-a-half seconds.

When the machine is turned on the standard 1, as above described, so that the patient faces the side of the machine, then the light will constantly vary in distance from the patient with the result that the focusing muscles are exercised. This may be done when the light is given any of the motions described above, though usually the straight-line horizontal motion will be used.

It is evident that many changes may be made in the details of the machine described and illustrated without departing from the spirit of my invention as outlined in the appended claims as, for instance, gearing may be substituted for the pulleys and belts, or bevel gears and a shaft may be substituted for the sprocket apparatus, or a spring motor may be substituted for the electric motor, or a bright object may be substituted for the electric light. Also several other types of control clutches may be substituted for the device shown.

Having described my invention, what I claim, is:—

1. In an eye exerciser, the combination of a rotating arm; a second arm rotatably carried by said first arm; means operatively connecting the first arm with the second arm, whereby the relative rotation of said arms is controlled; control means interposed in said connecting means, whereby the relative rotation of said arms may be changed; and a visible object on said second arm.

2. In an eye exerciser, the combination of a container; a shaft rotatably mounted therein and extending therefrom; an arm secured to said shaft outside of said container; means for rotating said shaft and arm; a second arm mounted on the end of said first arm; a visible object on said second arm; and means for clamping the second arm to said first arm, whereby said visible object may be adjusted in relation to the axis of said shaft.

3. In an eye exerciser, the combination of a container; a hollow shaft mounted therein and extending therefrom; an arm secured to said hollow shaft outside of said container; a second shaft mounted centrally in said hollow shaft and extending therefrom; a second arm rotatably mounted on the end of said first arm; means connecting said second shaft with said second arm, whereby the rotation of said second arm on said first arm is controlled by said second shaft; means for driving said hollow shaft; and a visible object on said second arm.

4. In an eye exerciser, the combination of a container; a hollow shaft mounted therein and extending therefrom; an arm secured to said hollow shaft outside of said container; a second shaft mounted centrally in said hollow shaft and extending therefrom; a second arm rotatably mounted on the end of said first arm; means connecting said second shaft with said second arm, whereby said second arm turns through twice the angle through which said second shaft turns; means for driving said hollow shaft; a visible object on said second arm; and means for holding said second shaft from rotation in a selected position, whereby said visible object is caused to move on a selected straight line course across the field of operation with each half-rotation of said first arm.

5. In an eye exerciser, the combination of a container; a hollow shaft mounted therein and extending therefrom; an arm secured to said hollow shaft outside of said container; a second shaft mounted centrally in said hollow shaft and extending therefrom; a second arm rotatably mounted on the end of said first arm; means connecting said second shaft with said second arm, whereby said second arm turns through twice the angle through which said second shaft turns; means for driving said hollow shaft; a visible object on said second arm; and means for driving said second shaft, whereby said visible object is caused to move on a curved line across the field of operation with each half-rotation of said first arm.

6. In an eye exerciser, the combination of a container; a hollow shaft mounted therein and extending therefrom; an arm secured to said hollow shaft outside of said container; a second shaft mounted centrally in said hollow shaft and extending therefrom; a second arm rotatably mounted on the end of said first arm; means connecting said second shaft with said second arm, whereby said second arm turns through twice the angle through which said second shaft turns; means for driving said hollow shaft; a visible object on said second arm; and means for driving said second shaft from said first shaft, whereby said visible object is caused to move on a curved line across the field of operation with each half-rotation of said first arm.

7. In an eye exerciser, the combination of a container; a hollow shaft mounted therein and extending therefrom; an arm secured to said hollow shaft outside of said container; a second shaft mounted centrally in said hollow shaft and extending therefrom; a second arm rotatably mounted on the end of said first arm; means connecting said second shaft to said second arm, whereby said second arm turns through twice the angle through which said second shaft turns; means for driving said hollow shaft; a visible object on said second arm; and means for driving said second shaft from said first shaft at a relatively slow rate, whereby said visible object is caused to move on a curved line across the field of operation with each half-rotation of said first arm.

BIRTLEY A. BALL.